(12) United States Patent
Fujimori (10) Patent No.: US 11,310,744 B2
(45) Date of Patent: Apr. 19, 2022

(54) COMMUNICATION APPARATUS, CONTROL METHOD, AND STORAGE MEDIUM

(71) Applicant: CANON KABUSHIKI KAISHA, Tokyo (JP)

(72) Inventor: Yuki Fujimori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/668,173

(22) Filed: Oct. 30, 2019

(65) Prior Publication Data

US 2020/0154359 A1 May 14, 2020

(30) Foreign Application Priority Data

Nov. 8, 2018 (JP) .............................. JP2018-210841

(51) Int. Cl.
*H04W 52/02* (2009.01)
*H04W 84/12* (2009.01)

(52) U.S. Cl.
CPC ........ *H04W 52/0241* (2013.01); *H04W 84/12* (2013.01)

(58) Field of Classification Search
CPC ......... H04W 52/0229; H04W 52/0235; H04W 52/0241; H04W 52/0274; H04W 52/028; H04W 76/28; H04W 84/12; Y02D 30/70
See application file for complete search history.

(56) References Cited

U.S. PATENT DOCUMENTS

| | | | | |
|---|---|---|---|---|
| 9,313,739 B2 * | 4/2016 | Jafarian | ............ | H04W 52/0235 |
| 9,807,653 B2 * | 10/2017 | Chhabra | ............ | H04W 36/0083 |
| 10,117,171 B2 * | 10/2018 | Vyas | ............ | H04W 76/19 |
| 10,178,205 B2 * | 1/2019 | Vyas | ............ | H04W 80/00 |
| 10,462,744 B2 * | 10/2019 | Huang | ............ | H04W 52/0235 |
| 10,555,257 B2 * | 2/2020 | Yang | ............ | H04W 52/0229 |
| 10,735,960 B2 * | 8/2020 | Huang | ............ | H04W 52/0229 |
| 10,849,070 B2 * | 11/2020 | Kim | ............ | H04W 28/06 |
| 11,082,989 B2 * | 8/2021 | Chitrakar | ............ | H04W 72/12 |
| 2013/0286959 A1 * | 10/2013 | Lou | ............ | H04L 5/003 370/329 |

(Continued)

FOREIGN PATENT DOCUMENTS

| | | | | |
|---|---|---|---|---|
| CN | 108430099 A | * | 8/2018 | ........ H04W 52/0235 |
| CN | 111034278 A | * | 4/2020 | ........ H04W 52/0229 |

(Continued)

OTHER PUBLICATIONS

Park et al., Proposal for Wake-Up Receiver (WUR) Study Group, May 2016, IEEE, doc.: IEEE 802.11-16/0722r1 (Year: 2016).*

(Continued)

*Primary Examiner* — Eric Nowlin
(74) *Attorney, Agent, or Firm* — Canon U.S.A., Inc. IP Division (57) ABSTRACT

A communication apparatus determines that communication with another communication apparatus as a transmission destination of a signal generated by a wake-up radio (WUR) conforming to the Institute of Electrical and Electronics Engineers (IEEE) 802.11ba standard, has been disconnected, based on communication conforming to the IEEE 802.11 series standard, and performs control to stop transmission of a predetermined signal performed by the WUR.

15 Claims, 5 Drawing Sheets

(56) References Cited

U.S. PATENT DOCUMENTS

| | | | | |
|---|---|---|---|---|
| 2014/0112225 | A1* | 4/2014 | Jafarian | H04W 52/0235 370/311 |
| 2015/0350875 | A1* | 12/2015 | Chhabra | H04W 36/00837 455/432.1 |
| 2017/0003736 | A1* | 1/2017 | Turon | H04L 12/2816 |
| 2017/0332318 | A1* | 11/2017 | Vyas | H04W 48/20 |
| 2017/0346931 | A1* | 11/2017 | Vyas | H04W 76/20 |
| 2018/0234921 | A1* | 8/2018 | Huang | H04W 52/0235 |
| 2018/0255514 | A1 | 9/2018 | Sun | |
| 2018/0295595 | A1* | 10/2018 | Shellhammer | H04W 52/0206 |
| 2019/0045445 | A1* | 2/2019 | Huang | H04W 72/0446 |
| 2019/0069176 | A1* | 2/2019 | Huang | H04L 9/3228 |
| 2019/0075521 | A1* | 3/2019 | Kneckt | H04W 52/0258 |
| 2019/0230581 | A1* | 7/2019 | Hwang | H04W 48/10 |
| 2019/0246351 | A1* | 8/2019 | Yang | H04W 52/0216 |
| 2019/0281551 | A1* | 9/2019 | Kim | H04W 52/02 |
| 2019/0349857 | A1* | 11/2019 | Kim | H04W 48/10 |
| 2020/0120607 | A1* | 4/2020 | Kim | H04W 52/02 |
| 2020/0137770 | A1* | 4/2020 | Chitrakar | H04L 27/2602 |
| 2020/0153747 | A1* | 5/2020 | Takada | H04L 47/6215 |
| 2020/0154359 | A1* | 5/2020 | Fujimori | H04W 52/0241 |
| 2020/0154517 | A1* | 5/2020 | Takada | H04W 52/0216 |
| 2020/0178178 | A1* | 6/2020 | Huang | H04W 52/028 |
| 2020/0275373 | A1* | 8/2020 | Hwang | H04W 28/04 |
| 2020/0280920 | A1* | 9/2020 | Huang | H04W 76/28 |
| 2020/0322889 | A1* | 10/2020 | Chitrakar | H04L 27/26 |
| 2020/0336981 | A1* | 10/2020 | Inohiza | H04W 52/0235 |
| 2020/0344005 | A1* | 10/2020 | Komoriya | H04L 1/188 |
| 2020/0344695 | A1* | 10/2020 | Wang | H04W 52/0274 |
| 2020/0367170 | A1* | 11/2020 | Huang | H04W 52/0235 |
| 2021/0084711 | A1* | 3/2021 | Park | H04W 76/15 |
| 2021/0185597 | A1* | 6/2021 | Chitrakar | H04W 52/0216 |
| 2021/0227471 | A1* | 7/2021 | Chitrakar | H04W 84/12 |
| 2021/0258877 | A1* | 8/2021 | Chitrakar | H04W 52/0216 |
| 2021/0337558 | A1* | 10/2021 | Chitrakar | H04W 72/12 |

FOREIGN PATENT DOCUMENTS

| | | | | | |
|---|---|---|---|---|---|
| EP | | 3644654 A1 | * | 4/2020 | H04W 76/28 |
| EP | | 3644654 A4 | * | 7/2020 | H04W 52/0229 |
| GB | | 2506422 A | * | 4/2014 | H04W 60/06 |
| WO | WO-2019004741 A1 | | * | 1/2019 | H04W 52/0216 |

OTHER PUBLICATIONS

Huang, Specification Framework for TGba, Apr. 10, 2017, IEEE, doc.: IEEE 802.11-15/0132r15 (Year: 2017).*

Stanley, WG11 Opening Report Snapshot slides Nov. 2017, Nov. 5, 2017, IEEE, doc.: IEEE 802.11-17/1558r1 (Year: 2017).*

* cited by examiner

COMMUNICATION APPARATUS, CONTROL METHOD, AND STORAGE MEDIUM

BACKGROUND

Field of the Disclosure

The present disclosure relates to a power saving technology in wireless communication.

Description of the Related Art

In recent years, Institute of Electrical and Electronics Engineers (IEEE) is examining the IEEE 802.11ba standard in order to improve power saving performance in wireless communication. In the IEEE 802.11ba standard, a wake-up radio (WUR) is provided separately from a primary connectivity radio (PCR) that is an existing radio frequency (RF) circuit to improve power saving performance.

The WUR can operate with power consumption lower than that of the PCR. When the PCR does not perform communication, the PCR is put into a doze state to improve power saving performance. In the IEEE 802.11ba standard, a WUR access point (AP) operating in an AP and a WUR non-AP station (STA) operating in a non-AP STA are specified (United States Patent Publication Application No. 20180255514).

In the IEEE 802.11ba standard, the WUR non-AP STA does not include a transmission function, and the WUR AP cannot perform an existence check of the WUR non-AP STA using the WUR. Accordingly, even when the WUR AP is disconnected from the WUR non-AP STA, the WUR AP cannot detect the disconnection and continuously operates the WUR. The WUR AP continuously transmits a signal, and thus causes unnecessary consumption of a communication band.

SUMMARY

In some embodiments, a communication apparatus includes a first determination unit configured to determine whether communication with another communication apparatus that is a transmission destination of a signal generated by a wake-up radio (WUR) conforming to Institute of the Electrical and Electronics Engineers (IEEE) 802.11ba standard, has been disconnected, based on communication in a primary connectivity radio (PCR) conforming to the IEEE 802.11ba standard, and a control unit configured to perform control to stop transmission of a predetermined signal performed by the WUR based on a result of the determination by the first determination unit.

Further features of various embodiments will become apparent from the following description of exemplary embodiments with reference to the attached drawings.

DESCRIPTION OF THE EMBODIMENTS

Figure 1:
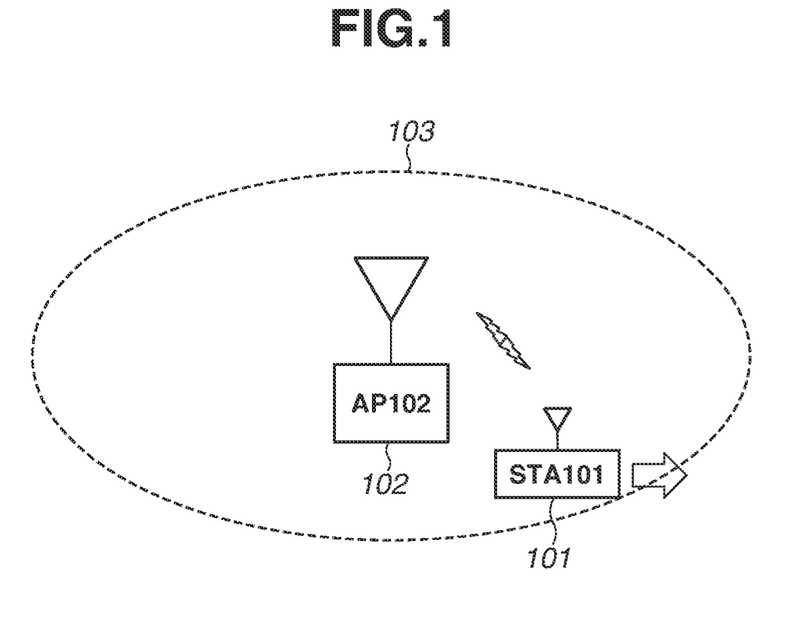
FIG. 1 is a block diagram illustrating a network configuration example.

FIG. 1 illustrates a wireless network configuration according to an exemplary embodiment. An access point (AP) 102 is a wake-up radio (WUR) AP conforming to the Institute of Electrical and Electronics Engineers (IEEE) 802.11ba standard, and is a communication apparatus including a primary connectivity radio (PCR) and a WUR conforming to the IEEE 802.11ba standard as described below. The PCR of the AP 102 forms a wireless network conforming to the IEEE 802.11 series standard.

The AP 102 can perform data communication with a station (STA) 101 by transmitting and receiving a frame (Frame) conforming to the IEEE 802.11 series standard using the PCR. Although the AP 102 is described as an access point conforming to the IEEE 802.11 series standard, the AP 102 is not limited thereto and may be a base station, such as a group owner conforming to wireless fidelity (Wi-Fi) direct standard.

The STA 101 is a WUR non-AP STA (hereinafter, referred to as WUR STA) conforming to the WEE 802.11ba standard. The STA 101 includes a PCR and a WUR as with the AP 102. The STA 101 establishes a wireless connection with the AP 102 by transmitting and receiving a predetermined frame conforming to the IEEE 802.11 series standard using the PCR. For example, the STA 101 transmits an Authentication Request Frame (e.g., authentication request) to the AP 102, and the AP 102 transmits an Authentication Response Frame (e.g., authentication response) in response to the request. Thereafter, the STA 101 transmits an Association Request Frame (e.g., connection request) to the AP 102, and the AP 102 transmits an Association Response Frame (e.g., connection response) in response to the request. The wireless connection is thus established in the above-described manner. The WUR of the STA 101 does not include a transmission function to transmit a frame (WUR Frame) conforming to the IEEE 802.11ba series standard, and includes only a reception function to receive the WUR Frame transmitted from the WUR of the AP 102.

A communication range 103 is a range where a signal transmitted from each of the PCR and the WUR of the AP 102 is receivable. The STA 101 located in the communication range 103 can receive the signal transmitted from the AP 102. Difference between a receiving range of the signal transmitted from the PCR of the AP 102 and a receiving range of the signal transmitted from the WUR of the AP 102 is desirably small; however, the ranges are not limited thereto. This configuration is only an illustrative example. A plurality of STAs may be present in the wireless network, and the positional relationship between the STA and the AP is not limited to the exemplary embodiment illustrated in FIG. 1.

Figure 2:
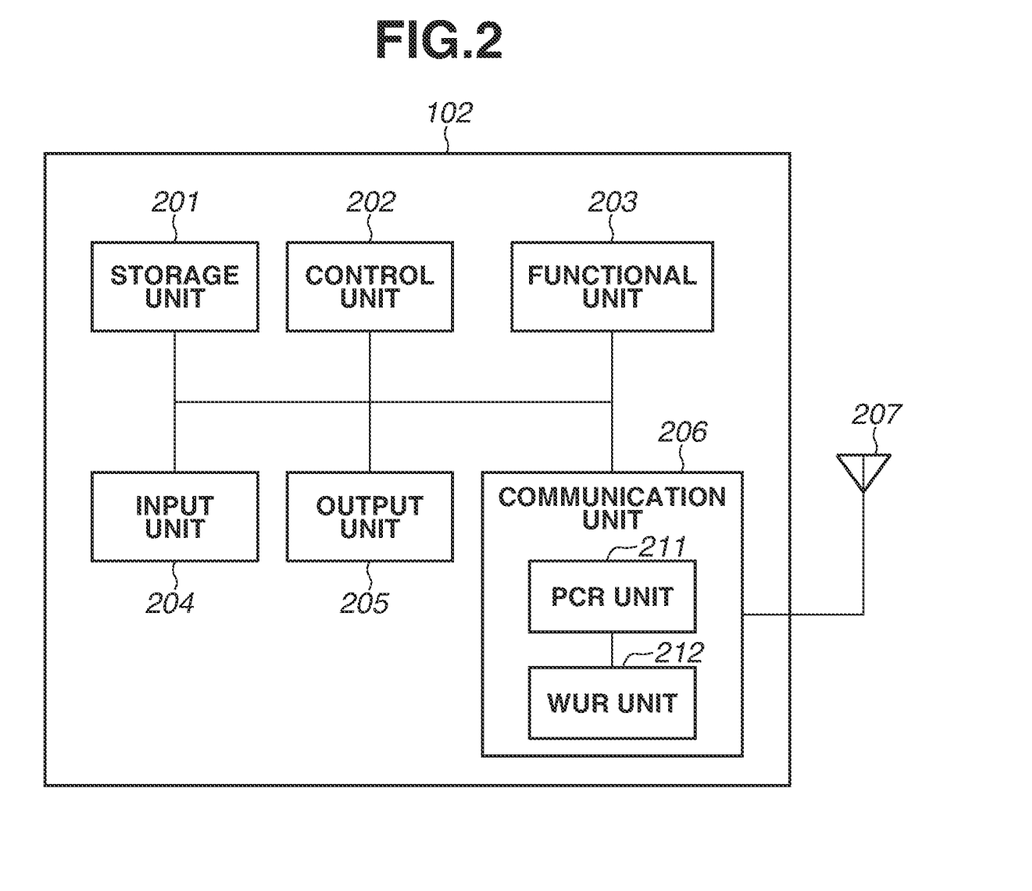
FIG. 2 is a block diagram illustrating a hardware configuration of an access point (AP).

FIG. 2 illustrates a hardware configuration of the AP 102. A storage unit 201 includes one or more memories, such as a read-only memory (ROM) and a random access memory (RAM). The storage unit 201 stores programs to perform various kinds of operations described below and stores various kinds of information, such as communication parameters for wireless communication. The storage unit 201 may include, in addition to the memory, such as the ROM and the RAM, a storage medium, such as a flexible disk, a hard disk, an optical disk, a magneto-optical disk, a compact disc-ROM (CD-ROM), a CD recordable (CD-R), a magnetic tape, a nonvolatile memory card, and a digital versatile disk (DVD).

The storage unit 201 manages the number of STAs that are connected to the AP 102 and operate in a WUR mode conforming to the IEEE 802.11ba standard. The storage unit 201 further records identification (ID) of each of the STAs that are connected to the AP 102 and operate in the WUR mode. The ID indicates, for example, a media access control (MAC) address of the PCR of each of the STAs. Alternatively, an association ID (AID) of each of the STAs may be used as the ID.

A control unit 202 includes one or more processors, such as a central processing unit (CPU) and a microprocessor unit (MPU), and executes a program stored in the storage unit 201 to control the whole of the AP 102. The control unit 202 may control the whole of the AP 102 in cooperation with the program and an operation system (OS) stored in the storage unit 201. Alternatively, the control unit 202 may include a plurality of processors, such as a multi-core processor, and the whole of the AP 102 may be controlled by the plurality of processors.

The control unit 202 controls a functional unit 203 to perform predetermined processing, such as imaging, printing, and projection. The functional unit 203 is hardware for the AP 102 to perform the predetermined processing. For example, in a case where the AP 102 is a camera, the functional unit 203 serves as an imaging unit that performs imaging processing. In a case where the AP 102 is a printer, the functional unit 203 serves as a print unit that performs print processing. In a case where the AP 102 is a projector, the functional unit 203 serves as a projection unit that performs projection processing. Data processed by the functional unit 203 may be stored in the storage unit 201. The data may also be communicated to the other communication apparatus through a communication unit 206 described below.

An input unit 204 receives various kinds of operation from a user. An output unit 205 performs various kinds of outputs to the user. The output performed by the output unit 205 may include at least one of display on a screen, audio output by a speaker, and vibration output. Both the input unit 204 and the output unit 205 may be integrated into a single module, such as a touch panel.

The communication unit 206 controls wireless communication conforming to the IEEE 802.11 series standard and the IEEE 802.11ba standard. The communication unit 206 includes a PCR unit 211, which is a radio frequency (RF) circuit for the PCR, and a WUR unit 212 which is an RF circuit for the WUR.

The AP 102 transmits the WUR Frame conforming to the IEEE 802.11ba standard to an opposite WUR STA using the WUR unit 212. Examples of the WUR Frame include a WUR Beacon, a WUR Wake-Up Frame, a WUR Discovery Frame, and a WUR Vender Specific Frame.

The WUR Beacon is transmitted to maintain synchronization between the AP 102 and the WUR STA.

The WUR Wake-Up Frame is transmitted when the AP 102 requires the PCR of the opposite WUR STA to transition from a doze state to an awake state conforming to the IEEE 802.11 series standard. The WUR Wake-Up Frame includes an Address Field, and the Address Field includes a WUR ID (WID) to identify the WUR STA. The WUR STA checks the WID to determine whether the WUR Wake-Up Frame is addressed to the own STA. In a case where the WUR Wake-Up Frame is addressed to the own STA, the WUR STA puts the PCR of the own STA into an awake state, and sends a response frame from the PCR unit of the STA 101 to the AP 102 to notify reception of the WUR Wake-Up Frame.

The WUR Discovery Frame is transmitted to enable the WUR STA to easily detect the AP 102. The WUR Vendor Specific Frame is transmitted to notify the WUR STA of information unique to a manufacturer or a product.

The communication unit 206 controls an antenna 207 to perform transmission/reception of a radio signal including the above-described various frames. The AP 102 performs communication of contents, such as image data, document data, and video data, with another STA 101 through the communication unit 206.

The PCR unit 211 and the WUR unit 212 are each configured as an independent RF circuit. The configuration, however, is not limited thereto, and the PCR unit 211 and the WUR unit 212 may be configured as an integral RF circuit. In this case, to put the PCR unit 211 into an awake state, the AP 102 enables a function related to the PCR unit 211. On the other hand, to put the PCR unit 211 into a doze state, the AP 102 disables the function related to the PCR unit 211. The AP 102 performs control of the WUR unit 212 in a similar manner. In the case where the function related to the WUR unit 212 is enabled, the RF circuit in which the PCR unit 211 and the WUR unit 212 are integrated is operated with lower power as compared with a case where the function related to the PCR unit 211 is enabled. In the case where the PCR unit 211 and the WUR unit 212 are configured as the integral RF circuit and the function as the PCR unit 211 is enabled, the integral RF circuit itself serves as the PCR unit 211. In contrast, in the case where the PCR unit 211 and the WUR unit 212 are configured as the integral RF circuit and the function as the WUR unit 212 is enabled, the integral RF circuit itself serves as the WUR unit 212.

Next, an Action Frame specified by the IEEE 802.11ba standard is described. The Action Frame specified by the IEEE 802.11ba standard indicates a frame in which Category Code included in the frame is "32". Setting zero to a WUR Action Field in the Action Frame indicates a WUR Mode Setup Frame transmitted and received at start of WUR mode operation. Setting one to the WUR Action Field indicates a WUR Mode Teardown Frame transmitted and received at end of the WUR mode operation.

The WUR Mode Setup Frame further includes a WUR Mode Element including an Action Type Field. The Action Type Field represents a type of WUR mode processing. The Action Type Field having a value of zero represents an Enter WUR Mode Request Frame. The Enter WUR Mode Request Frame is a frame for the STA as a transmission source to request the AP to start processing of the WUR mode conforming to the IEEE 802.11ba standard.

The Action Type Field having a value of one represents an Enter WUR Mode Response Frame. The Enter WUR Mode Response Frame is a response frame to the Enter WUR Mode Request Frame. The Enter WUR Mode Response Frame further includes a WUR Mode Response Status Definition Field indicating whether to accept the start of the WUR mode requested by the Enter WUR Mode Request Frame.

The WUR Mode Response Status Definition Field having a value of zero represents "Accept". Accept represents that the AP receives processing in the WUR mode requested by the STA 101. In contrast, the WUR Mode Response Status Definition Field having a value of one or two represents "Denied". Denied represents that the AP denies the processing in the WUR mode requested by the STA.

The WUR Mode Element further includes a WUR Duty Cycle Period representing an operation period of the WUR and a Starting Time Of The WUR Duty Cycle representing a starting time of the operation period. The operation period of the WUR includes a period during which the WUR unit of the STA is in an awake state where the WUR unit of the STA can receive a signal from the WUR unit of the AP and a period during which the WUR unit of the STA is in a doze state where the WUR unit of the STA cannot receive the signal. The period during which the WUR unit of the STA is in the awake state is shown as "On Duration" in the WUR Mode Element, and it is guaranteed that the WUR STA can receive the WUR Frame from the WUR AP in this period.

Next, flow of the processing performed by the AP 102 according to the present exemplary embodiment is described with reference to FIG. 3 and FIG. 4. The processing is achieved when the control unit 202 executes the program stored in the storage unit 201. A part or all of the operations of the flow chart illustrated in FIG. 3 and FIG. 4 may be achieved by hardware, such as an application specific integrated circuit (ASIC).

Figure 3:
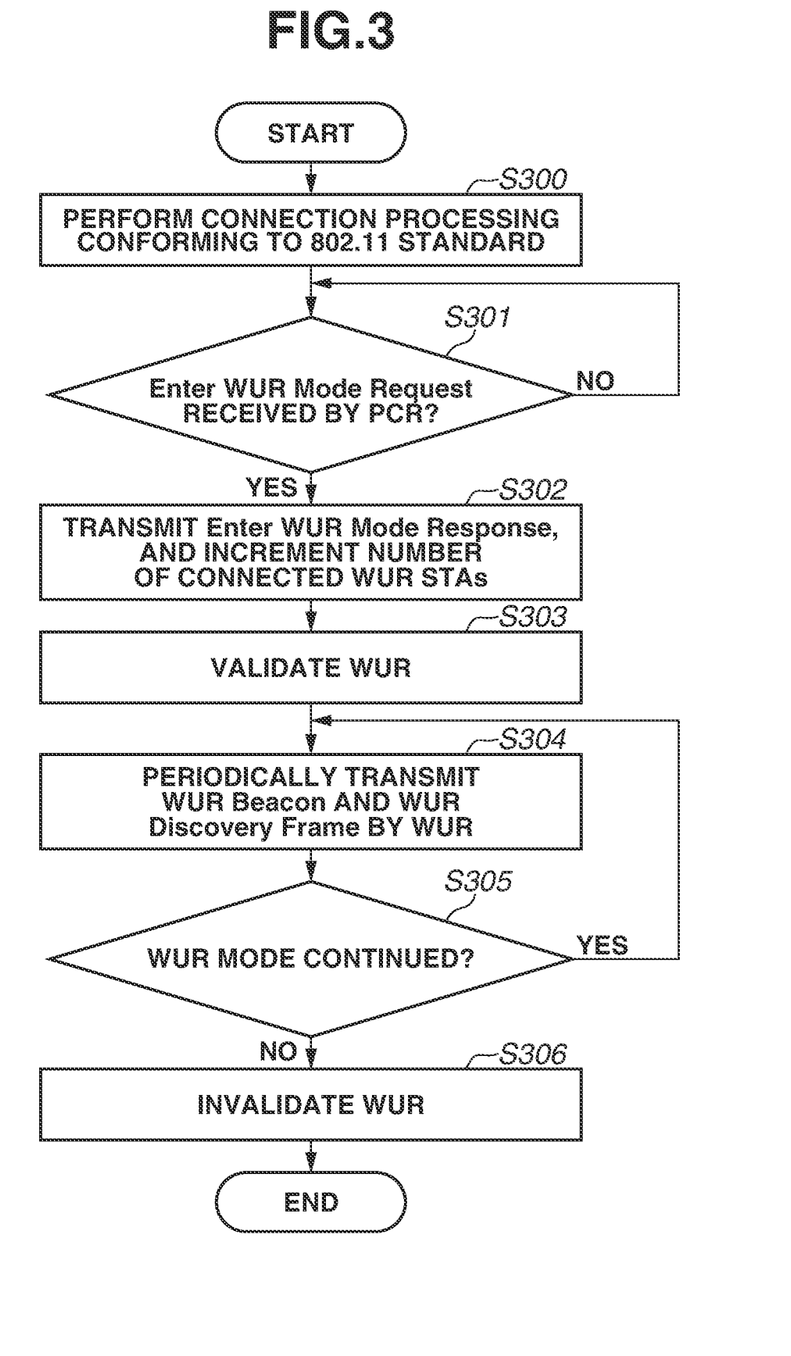
FIG. 3 is a flowchart illustrating flow of processing performed by the AP.
Figure 4:
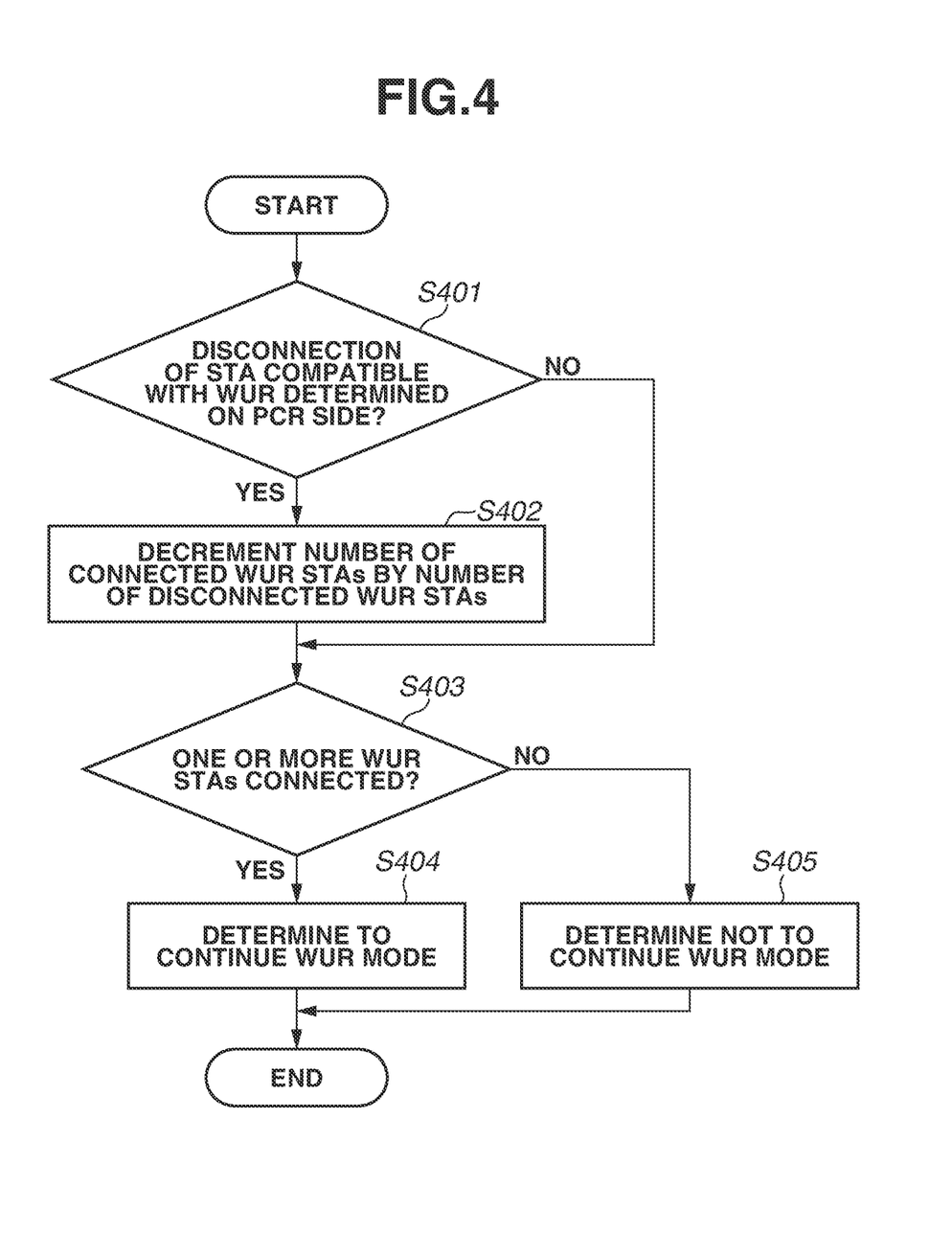
FIG. 4 is a flowchart illustrating flow of processing performed by the AP.

FIG. 3 is a flowchart illustrating a flow of processing performed by the AP 102 from the point of validation to the point of invalidation of the WUR unit 212. This flowchart is performed when the AP 102 is activated. As an assumption, this flow starts in a state where the WUR unit 212 of the AP 102 is invalidated. If the WUR unit 212 is validated, the AP 102 invalidates the WUR unit 212 and then starts this flowchart. Further, the number of connected WUR STAs recorded in the storage unit 201 is assumed to be set to zero as an initial value.

The WUR unit 212 is validated when, for example, the control unit 202 performs control to start supply of power and a clock to the WUR unit 212, or the control unit 202 executes a program to operate the WUR unit 212.

To the contrary, the WUR unit 212 is invalidated when, for example, the control unit 202 stops supply of the power and the clock to the WUR unit 212, the control unit 202 stops a program to operate the PCR unit 211 and the WUR unit 212 in the WUR mode, or the control unit 202 stops transmission of the WUR Frame, such as the WUR Beacon and a WUR Discovery Frame transmitted by the WUR unit 212. Even in the case where the WUR unit 212 is invalidated, the PCR unit 211 can notify the STA of information about the WUR using, for example, a Beacon Frame. Validation and invalidation performed by the WUR unit 212 includes execution of a part of these operations.

In S300, the AP 102 uses the PCR unit 211 to perform, with the STA 101, connection processing conforming to the IEEE 802.11 series standard. In the connection processing, the AP 102 uses the PCR unit 211 to notify the STA 101 of the information about the WUR. More specifically, the AP 102 notifies that the AP 102 is compatible with the WUR by adding WUR Capabilities Element to the Beacon Frame or a Probe Response Frame transmitted with use of the PCR unit 211. The AP 102 can further share parameters required for operation of the WUR with the STA 101 by adding a WUR Operation Element to a predetermined management frame. The parameters include a WUR Channel representing transmission channel information of the WUR, and a WUR Beacon Period representing a transmission interval of the WUR Beacon. The predetermined management frame is the Beacon Frame, the Probe Response Frame, or the Association Response Frame.

When the connection processing with the STA 101 is performed and a wireless connection is established, in S301, the AP 102 uses the PCR unit 211 to wait for the Enter WUR Mode Request Frame from the STA 101. When receiving the Enter WUR Mode Request Frame (YES in S301), the AP 102 uses the PCR unit 211 to transmit the Enter WUR Mode Response Frame in S302. The AP 102 sets the WUR Mode Response Status Definition Field of the Enter WUR Mode Response Frame to zero.

In S302, the AP 102 further increments the number of connected WUR STAs recorded in the storage unit 201. To identify the STA (e.g., STA 101 in this embodiment) that has transmitted the Enter WUR Mode Request Frame, the AP 102 records an ID for unique identification of the STA in the storage unit 201.

In S303, the STA 101 that has received the Enter WUR Mode Response Frame starts operation in the WUR mode. On the other hand, the AP 102 validates the WUR unit 212 to start operation in the WUR mode. In S304, when the AP 102 starts the operation in the WUR mode, the AP 102 uses the WUR unit 212 to periodically transmit the WUR Beacon and a WUR Discovery Frame. These frames conform to the IEEE 802.11ba standard.

The WUR Beacon is transmitted at a period of WUR Beacon Period through the WUR Channel notified to the STA 101 by the WUR Operation Element. The WUR Beacon includes a Transmit ID for identification of the AP 102, and a TD Control for synchronization with the STA 101. The STA 101 synchronizes reception timing of the WUR Beacon using these information and a Starting Time Of The WUR Duty Cycle. The Starting Time Of The WUR Duty Cycle is included in the WUR Mode Element of the WUR Mode Setup Frame.

The WUR Discovery Frame is transmitted based on the information notified by a WUR Discovery Element included in the Beacon Frame and the Probe Response Frame of the PCR. The WUR Discovery Frame is the WUR Frame used by the WUR STA to discover the WUR AP. The WUR Discovery Frame is transmitted from the AP 102 every period set in a WUR Discovery Period, through the channel set in a WUR Discovery Channel.

When the AP 102 is operated in the WUR mode, the AP 102 transmits the Wake-Up Frame to wake up the PCR unit of the STA 101 operating in the WUR mode (e.g., to put the PCR unit into "awake state" specified by the IEEE 802.11 series standard) as required. The awake state is a state where the PCR unit of the STA 101 can perform transmission/reception of a signal to/from the PCR unit 211 of the AP 102.

In S305, the AP 102 determines whether to continue the operation in the WUR mode. The detail of the determination processing is described below with reference to FIG. 4. The determination processing may be performed for a predetermined time period, or may be performed at a specific event, such as disconnection detection of the STA 101, as a trigger.

In a case where it is determined that the WUR mode is continued (YES in S305), the processing returns to S304. In a case where it is determined that the WUR mode is not continued (NO in S305), the AP 102 invalidates the WUR unit 212, and the processing in FIG. 3 ends. The processing may return to S301 after S306.

As described above, by invalidating the WUR when it is not required to continue the operation in the WUR mode, a processing load and power consumption used in the AP 102 can be reduced. Further, the WUR Beacon and the WUR Discovery Frame are not transmitted, which makes it possible to suppress unnecessary consumption of the band.

The case where operation in the WUR mode is performed with the first WUR STA has been described above. After the AP 102 is connected with the first WUR STA, the AP 102 waits for the start of the connection processing executed in S300 in order to connect second and subsequent WUR STAs. When the connection processing with the second and subsequent WUR STAs is performed, the AP 102 performs the processing (e.g., reception of Enter WUR Mode Request Frame) in and after S301, with the connected STAs. In this case, the AP 102 is not required to perform S303.

Next, the processing executed in S305 of FIG. 3 is described in detail with reference to FIG. 4. In S401, the AP 102 determines whether the WUR STA (e.g., STA 101) has been disconnected, based on communication with the STA 101 via the PCR unit 211.

For example, in a case where the PCR unit 211 of the AP 102 does not receive a frame conforming to the IEEE 802.11 series standard from the STA 101 for a predetermined time (e.g., three minutes), the AP 102 determines that the STA 101 has been disconnected. The frame to be received may be a data frame, an Action Frame, or an existence check frame, such as a Null Data Packet. The AP 102 may include a not-illustrated timer to determine the predetermined time corresponding to each of the STAs. Thereby, it can be specified that the disconnected STA is the STA 101.

Further, in a case, for example, where the PCR unit 211 of the AP 102 receives a disconnection frame from the STA 101, the AP 102 may determine that the STA 101 has been disconnected. The disconnection frame is a Disassociation Frame or a Deauthentication Frame conforming the IEEE 802.11 series standard. The AP 102 refers to the ID of the STA (e.g., MAC address) representing a transmission source included in the disconnection frame. Thereby, it can be specified that the disconnected STA is the STA 101.

Further, in a case, for example, where the PCR unit 211 of the AP 102 transmits the disconnection frame to the STA 101, the AP 102 may determine that the STA 101 has been disconnected. The AP 102 refers to the ID of the STA (e.g., MAC address) representing a transmission destination included in the disconnection frame. Thereby, it can be specified that the disconnected STA is the STA 101.

Further, in a case, for example, where the PCR unit 211 of the AP 102 transmits, to the STA 101, a frame requiring a response and does not receive a response to the frame from the STA 101 within a predetermined time, the AP 102 may determine that the STA 101 has been disconnected. The frame requiring a response is, for example, a data frame, a Null Data Packet Frame, and a Trigger Frame. The AP 102 refers to the ID of the STA (e.g., MAC address) representing a transmission source included in the response. Thereby, it can be specified that the disconnected STA is the STA 101. Alternatively, in a case where the PCR unit 211 of the AP 102 transmits, to the STA 101, a frame requiring a response a plurality of times and does not receive a response from the STA 101 even once, the AP 102 may determine that the STA 101 has been disconnected.

Further, in a case, for example, where the WUR unit 212 of the AP 102 transmits WUR Wake-Up Frame to the STA 101 and does not receive a response to the frame from the STA 101 within a predetermined time, the AP 102 may determine that the STA 101 has been disconnected.

Further, in a case, for example, where the PCR unit 211 of the AP 102 receives the WUR Mode Teardown Frame from the STA 101, the AP 102 may determine that the STA 101 has been disconnected. The AP 102 refers to the ID of the STA (e.g., MAC address) representing a transmission source included in the WUR Mode Teardown Frame. Thereby, it can be specified that the disconnected STA is the STA 101. In a case, for example, where the STA 101 cannot receive the WUR Beacon frame transmitted by the AP 102 for a predetermined time, the STA 101 transmits the WUR Mode Teardown Frame by the PCR. Even when the STA 101 cannot receive the signal from the WUR unit 212 of the AP 102, the signal transmitted by the STA 101 may reach the PCR unit 211. In this case, the STA 101 transmits the WUR Mode Teardown Frame to the AP 102, which makes it possible to reduce unnecessary continuation of the WUR mode performed in the AP 102.

As the processing executed in S401, the AP 102 may perform determination using any one of the above-described methods or a combination of the plurality of the methods. In a case where the determination is performed using a combination of the plurality of methods, the AP 102 determines that the WUR STA has been disconnected when disconnection of the WUR STA is determined by any of the methods.

In a case where it is determined in S401 that the WUR STA has been disconnected (YES in S401), the processing proceeds to S402. In a case where it is not determined that the WUR STA has been disconnected (NO in S401), the processing skips S402 to proceed to S403. In a case where the STA that does not operate in the WUR mode has been disconnected, the determination result performed in S401 becomes NO, and the processing proceeds to S403. Whether the STA determined as being disconnected is operating in the WUR mode can be determined by checking whether the ID of the STA specified by the above-described method is included in the IDs recorded in the storage unit 201 in S302. In other words, in a case where the ID of the STA determined as being disconnected is included in the IDs recorded in the storage unit 201 in S302, it is determined that the WUR STA has been disconnected. In contrast, in a case where the ID of the STA determined as being disconnected is not included in the IDs recorded in the storage unit 201 performed in S302, it is determined that the WUR STA has not been disconnected.

In a case where it is determined that the WUR STA has been disconnected, the AP 102 decrements, in S402, the number of connected WUR STAs recorded in the storage unit 201 by the number of WUR STAs determined as being disconnected in S401. In S402, the AP 102 further deletes the IDs of the WUR STAs determined as being disconnected.

In S403, the AP 102 checks whether the number of connected WUR STAs recorded in the storage unit 201 is greater than or equal to one. In a case where the number is greater than or equal to one (YES in S403), the AP 102 determines to continue the WUR mode in S404. Thus, the processing illustrated in FIG. 4 ends, and the processing returns to S304. On the other hand, in a case where the number of connected WUR STAs is lower than one, namely, zero (NO in S403), the AP 102 determines not to continue the WUR mode in S405. Thus, the processing illustrated in FIG. 4 ends, and the processing proceeds to S306.

Figure 5:
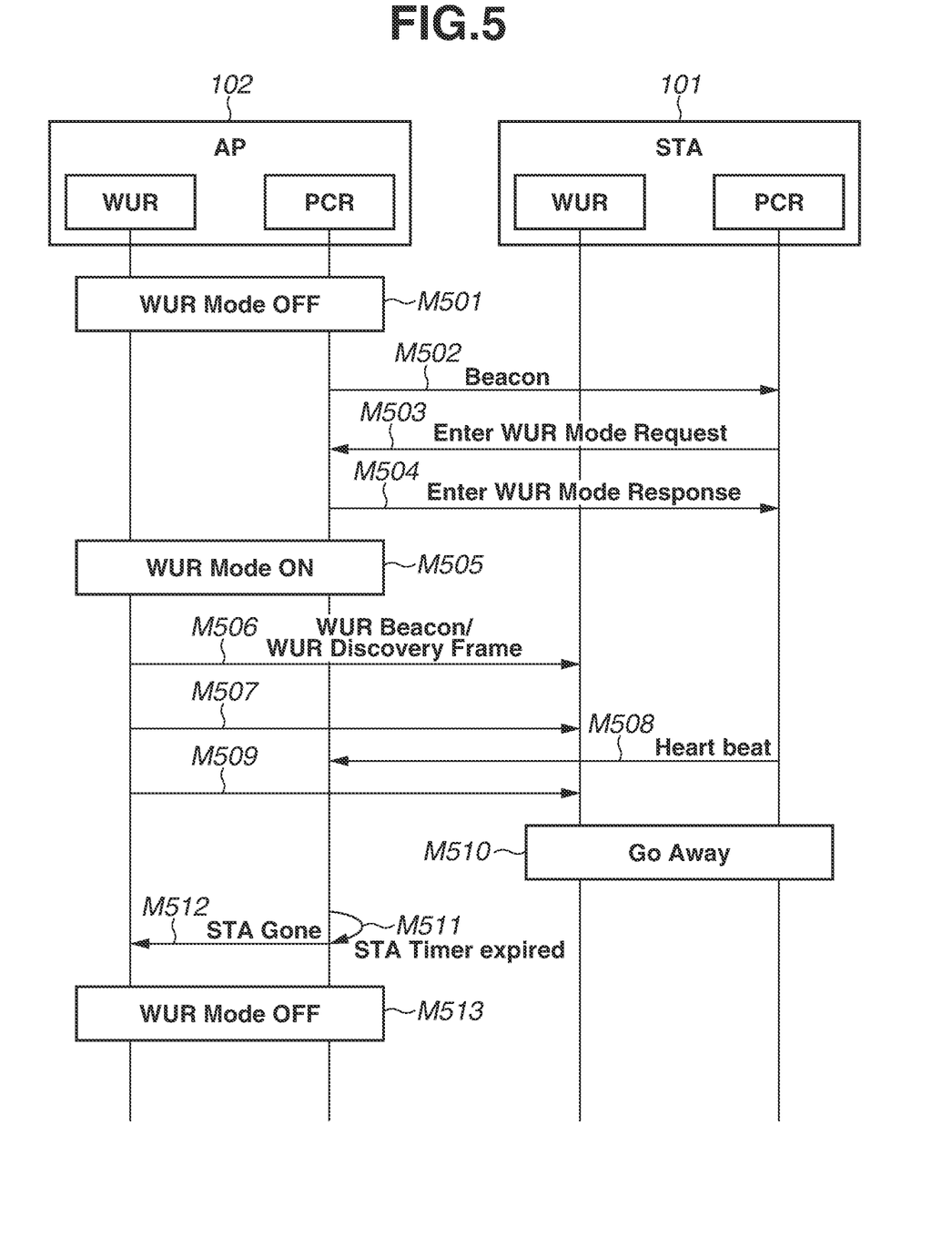
FIG. 5 is a diagram illustrating a sequence between the AP and a station (STA).

Next, a sequence according to the present exemplary embodiment is described with reference to FIG. 5. In M501, the AP 102 starts, after activation, processing in a state where the WUR unit 212 is invalidated. In M502, the PCR unit 211 transmits a Beacon Frame including a WUR Capability Element to notify that the AP 102 is compatible with the WUR, to the STA 101. The STA 101 receives the Beacon Frame by the PCR, and transmits, in M503, an Enter WUR Mode Request Frame to the PCR unit 211 of the AP 102.

The PCR unit 211 receives the Enter WUR Mode Request Frame, and transmits, in S504, an Enter WUR Mode Response in which WUR Mode Response Status Definition Field is set to zero, to the PCR of the STA 101. In response thereto, the AP 102 validates, in M505, the WUR unit 212 and starts operation in the WUR mode.

When the WUR mode is validated, the WUR unit 212 of the AP 102 periodically transmits one of or both the WUR Beacon and WUR Discovery Frame in M506, M507, and M509. During this time, the PCR of the STA 101 is periodically set into the awake state, and transmits an existence check frame (e.g., Heart beat) in M508. When the data frame to be transmitted from the STA 101 to the AP 102 is present, the STA 101 may transmit the data frame in place of Heart beat. Even when the data frame to be transmitted is not present, the STA 101 may transmit another frame, such as Null Data Packet, and PS-Poll.

In M510, it is assumed that the STA 101 moves away from the communication range 103 or communication becomes impossible due to, for example, sudden power-off during such communication. When the STA 101 moves away from the communication range 103, the existence check frame cannot be received by the AP 102. When a situation in which the STA 101 cannot perform communication due to, for example, sudden power-off occurs, the existence check frame is not transmitted from the STA 101.

In M511, the PCR of the AP 102 cannot perform the existence check of the STA 101, and thus determines that the STA 101 has been disconnected due to timeout (e.g., indicating that the existence check frame cannot be received for a predetermined period). When disconnection of the STA 101 is determined, the PCR unit 211 notifies the WUR unit 212 of the information in the AP 102 in M512. In M513, since the number of connected WUR STAs becomes zero, the AP 102 invalidates the WUR unit 212.

For timeout periods to determine a disconnection of the STA, a common value (e.g., a single length of time) or different values (e.g., different lengths of time) are set to a timeout period for the STA compatible with the WUR and a timeout period for the STA incompatible with the WUR. At this time, it is possible to improve power saving performance of the STA compatible with the WUR by maintaining the doze state of the PCR for a longer time. Therefore, if the timeout value for the STA comparable with the WUR is larger than the timeout value of the STA incompatible with the WUR, better effect can be achieved. The STA incompatible with the WUR is an apparatus that can perform communication conforming to the IEEE 802.11a, b, g, n, ac, or ax standards but cannot perform communication conforming to the IEEE 802.11ba standard.

In the above-described exemplary embodiment, the WUR unit 212 transmits a common WUR Beacon even when receiving the Enter WUR Mode Request Frame from each of the plurality of WUR STAs.

The configuration, however, is not limited thereto, and the WUR unit 212 may transmit a WUR Beacon at different timings among WUR STAs based on the information included in the Enter WUR Mode Request Frame transmitted from each of the WUR STAs. More specifically, the AP 102 may transmit a WUR Beacon at timing determined based on WUR Duty Cycle Period that is included in the Enter WUR Mode Request Frame and represents the operation period of the WUR.

In the case of such a configuration, the AP 102 stops transmission of the WUR Beacon to the WUR STA that has been determined as being disconnected in S402. In other words, the AP 102 stops transmission of the WUR Beacon to the WUR STA every time disconnection of the WUR STA is determined. In S306, the AP 102 invalidates the WUR unit 212, and stops transmission of the WUR Frame, such as a WUR Discovery Frame. Specifically, the AP 102 continues transmission of the WUR Frame, such as a WUR Discovery Frame, while the WUR STA under communication is present. When no WUR STAs are under communication, the AP 102 stops transmission of the WUR Beacon, and also stops transmission of, for example, the WUR Discovery Frame.

As described above, the AP 102 can stepwise reduce the number of WUR Frames to be transmitted every time the WUR STA is disconnected, and then stop transmission of the WUR Frame in response to the absence of a connected WUR STA.

The above-described exemplary embodiment can reduce unnecessary consumption of a communication band in the case where the AP 102 is disconnected from the WUR non-AP STA. Further, the AP 102 invalidates the WUR unit, and thus the processing load and the power consumption in the AP 102 can be reduced.

Some embodiments can be implemented by supplying a program performing one or more functions of the above-described exemplary embodiment to a system or an apparatus through a network or a storage medium, and by causing one or more processors in a computer included in the system or the apparatus to read and execute the program. Some embodiments can also be implemented by a circuit (e.g., ASIC) performing one or more functions.

According to various embodiments, consumption of a communication band by the WUR can be appropriately suppressed.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that various embodiments are not limited to the disclosed exemplary embodiments. The scope of the following claims is to be accorded the broadest interpretation so as to encompass all such modifications and equivalent structures and functions.

This application claims priority to Japanese Patent Application No. 2018-210841, which was filed on Nov. 8, 2018 and which is hereby incorporated by reference herein in its entirety.

What is claimed is:

1. A communication apparatus, comprising:
one or more memories having instructions stored therein; and
one or more processors that, upon execution of the instructions, are configured to:
determine whether communication with a first other communication apparatus has been disconnected, based on communication by a primary connectivity radio (PCR) conforming to Institute of Electrical and Electronics Engineers (IEEE) 802.11 series standard, the first other communication apparatus being a transmission destination of a signal to be generated by a wake-up radio (WUR) conforming to IEEE 802.11ba standard;
determine, in a case where communication with said first other communication apparatus is determined to have been disconnected, whether no other communication apparatus as being the transmission destination of the signal is present, and
perform control to stop transmission of the signal performed by the WUR in a case where no other communication apparatus as being the transmission destination is determined to be present, while not to stop transmission of the signal performed by the WUR in a case where a second other communication apparatus as being the transmission destination is determined to be present, the second other communication apparatus being different from the first other communication apparatus.

2. The communication apparatus according to claim 1, wherein communication with the first other communication apparatus is determined to have been disconnected, based on that communication by the PCR having not been performed with the first other communication apparatus for a first period.

3. The communication apparatus according to claim 2, the one or more processors are further configured to:
determine that communication with a third other communication apparatus not conforming to IEEE 802.11ba standard has been disconnected, based on that communication with the third other communication apparatus having not been performed for a second period,
wherein the first period and the second period are different in length from each other.

4. The communication apparatus according to claim 1, wherein communication with the first other communication apparatus is determined to have been disconnected, based on that a frame conforming to IEEE 802.11 series standard to be used to disconnect wireless connection having been communicated to the first other communication apparatus.

5. The communication apparatus according to claim 4, wherein the frame to disconnect wireless connection is a disassociation frame or a deauthentication frame conforming to IEEE 802.11 series standard.

6. The communication apparatus according to claim 4, wherein the frame to disconnect wireless connection is a WUR mode teardown frame conforming to IEEE 802.11ba standard.

7. The communication apparatus according to claim 6, wherein the one or more processors are further configured to:
transmit a WUR beacon conforming to IEEE 802.11ba standard,
wherein the WUR mode teardown frame is a frame transmitted by the first other communication apparatus based on that the first other communication apparatus having not received the WUR beacon transmitted by the communication apparatus.

8. The communication apparatus according to claim 1, the one or more processors are further configured to:
transmit a first frame conforming to IEEE 802.11 series standard, to the first other communication apparatus,
wherein, based on that the first frame being transmitted to the first other communication apparatus and a response to the first frame being not received from the first other communication apparatus, communication with the first other communication apparatus is determined to have been disconnected.

9. The communication apparatus according to claim 8, wherein the first frame is transmitted a plurality of times, and
wherein, based on that no response to the first frame transmitted the plurality of times being received, communication with the first other communication apparatus is determined to have been disconnected.

10. The communication apparatus according to claim 1, the one or more processors are further configured to:
transmit a second frame conforming to IEEE 802.11ba standard, to the first other communication apparatus,
wherein, based on that the second frame being transmitted to the first other communication apparatus and a response to the second frame being not received from the first other communication apparatus, communication with the first other communication apparatus is determined to have been disconnected.

11. The communication apparatus according to claim 1, wherein, based on that communication with the first other communication apparatus having been determined to be disconnected, a control to stop transmission of a WUR beacon conforming to IEEE 802.11ba standard performed by the WUR to the first other communication apparatus is performed.

12. The communication apparatus according to claim 1, wherein the control to stop transmission of the signal performed by the WUR includes a control to stop supply of power or a clock to the WUR is performed.

13. The communication apparatus according to claim 1, wherein the first other commutation apparatus is configured to not include a function to transmit a frame to be performed by the WUR.

14. A method of controlling a communication apparatus, the method comprising:
determining whether communication with a first other communication apparatus has been disconnected, based on communication by a primary connectivity radio (PCR) conforming to IEEE 802.11 series standard, the first other communication apparatus being a transmission destination of a signal to be generated by a WUR conforming to IEEE 802.11ba standard;
determining, in a case where communication with said first other communication apparatus is determined to have been disconnected, whether no other communication apparatus as being the transmission destination of the signal is present, and
performing control to stop transmission of the signal performed by the WUR in a case where no other communication apparatus as being the transmission destination is determined to be present, while not to stop transmission of the signal performed by the WUR in a case where a second other communication apparatus as being the transmission destination is determined to be present, the second other communication apparatus being different from the first other communication apparatus.

15. A non-transitory computer-readable storage medium storing a computer program for causing a computer to execute a method of controlling a communication apparatus, the method comprising:

determining whether communication with a first other communication apparatus has been disconnected, based on communication by a primary connectivity radio (PCR) conforming to IEEE 802.11 series standard, the first other communication apparatus being a transmission destination of a signal to be generated by a WUR conforming to IEEE 802.11ba standard;

determining, in a case where communication with said first other communication apparatus is determined to have been disconnected, whether no other communication apparatus as being the transmission destination of the signal is present, and performing control to stop transmission of the signal performed by the WUR in a case where no other communication apparatus as being the transmission destination is determined to be present, while not to stop transmission of the signal performed by the WUR in a case where a second other communication apparatus as being the transmission destination is determined to be present, the second other communication apparatus being different from the first other communication apparatus.

* * * * *